(No Model.) 7 Sheets—Sheet 2.

F., P. & C. QUINTUS.
BAND CUTTER AND FEEDER FOR THRESHING MACHINES.

No. 569,230. Patented Oct. 13, 1896.

(No Model.) 7 Sheets—Sheet 3.

F., P. & C. QUINTUS.
BAND CUTTER AND FEEDER FOR THRESHING MACHINES.

No. 569,230. Patented Oct. 13, 1896.

Witnesses:
Charles Shervey,
A. H. Ebbesen

Inventors
Frank Quintus
Paul Quintus
Charles Quintus
by Willis Spence & Bitner
Attys (No Model.) 7 Sheets—Sheet 6.

F., P. & C. QUINTUS.
BAND CUTTER AND FEEDER FOR THRESHING MACHINES.

No. 569,230. Patented Oct. 13, 1896.

Witnesses:
Charles Shewey
A. H. Ebbesen

Inventors
Frank Quintus
Paul Quintus
Charles Quintus
by Wilder Greene Behm
Attys

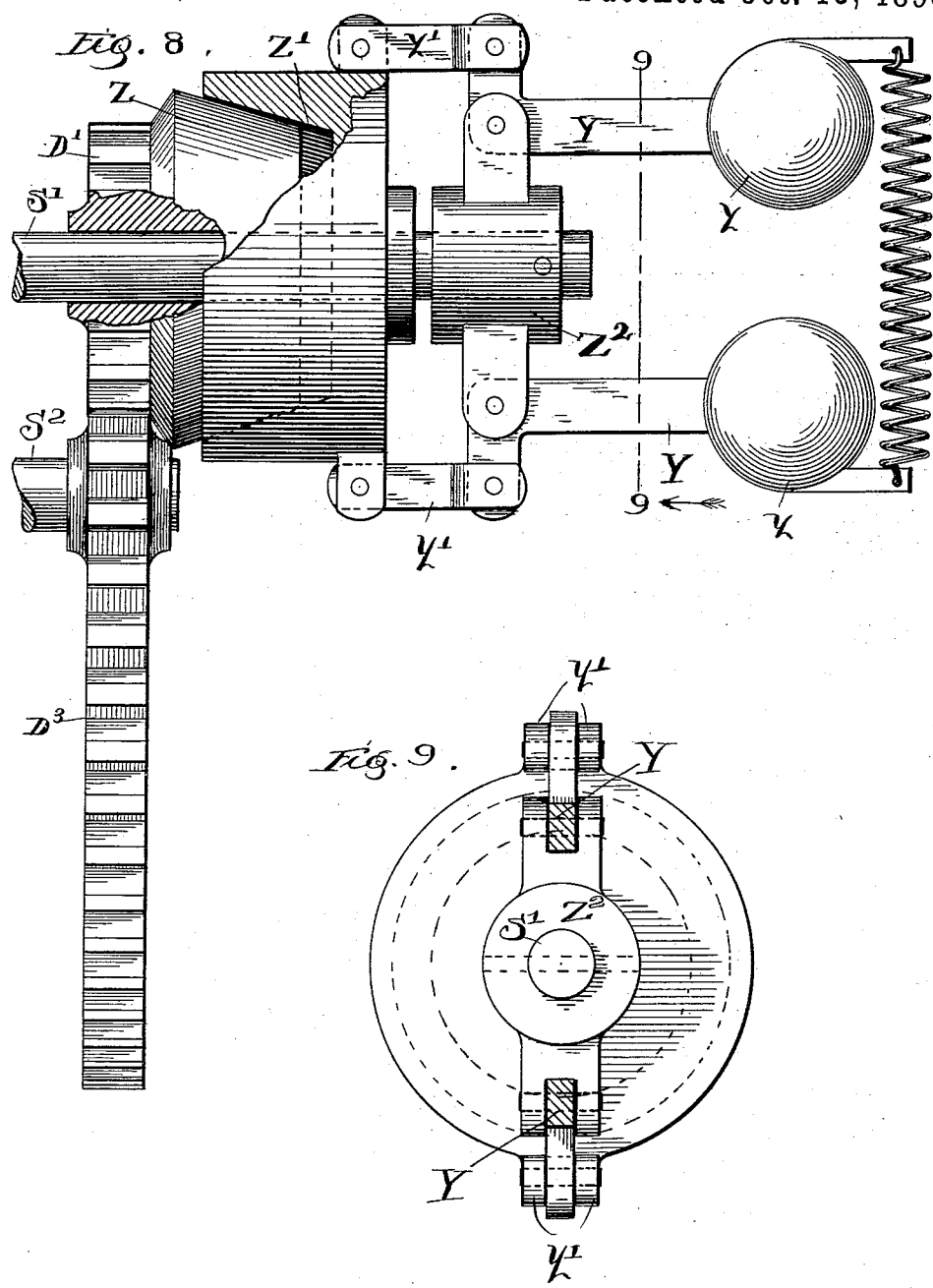

UNITED STATES PATENT OFFICE.

FRANK QUINTUS, PAUL QUINTUS, AND CHARLES QUINTUS, OF FREEPORT, ILLINOIS.

BAND-CUTTER AND FEEDER FOR THRESHING-MACHINES.

SPECIFICATION forming part of Letters Patent No. 569,230, dated October 13, 1896.

Application filed November 4, 1895. Serial No. 567,814. (No model.)

*To all whom it may concern:*

Be it known that we, FRANK QUINTUS, PAUL QUINTUS, and CHARLES QUINTUS, citizens of the United States of America, residing at Freeport, in the county of Stephenson and State of Illinois, have invented certain new and useful Improvements in Band-Cutters and Feeders for Threshing-Machines, of which the following is a specification.

Our invention relates to improvements in band-cutters and feeders for threshing-machines, its object being to provide a practical threshing-machine attachment adapted to receive bundles of grain, cut the bands, and distribute and feed the grain evenly to the thresher.

The invention is fully described and explained in this specification and shown in the accompanying drawings, in which—

Figure 1:
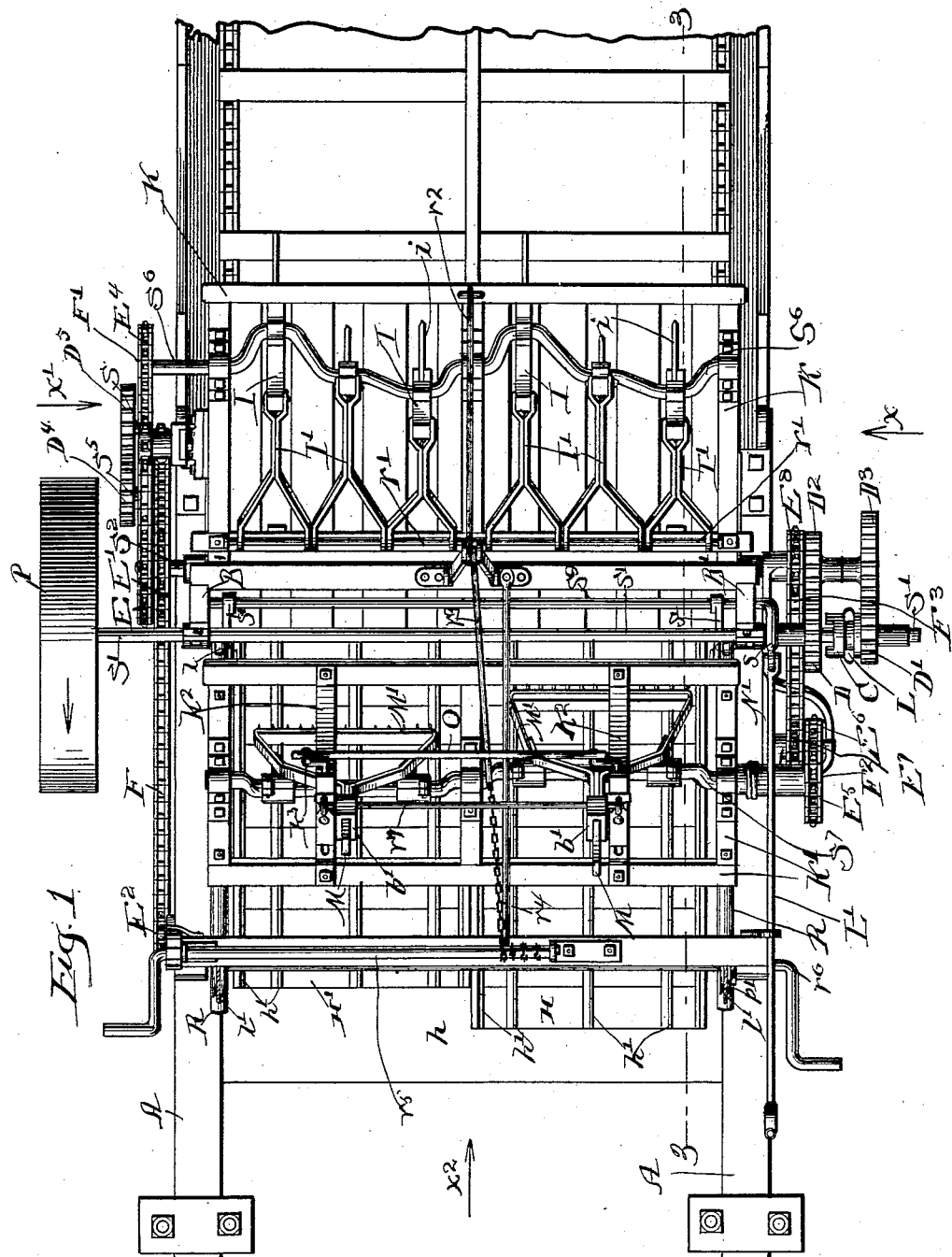
Figure 2:
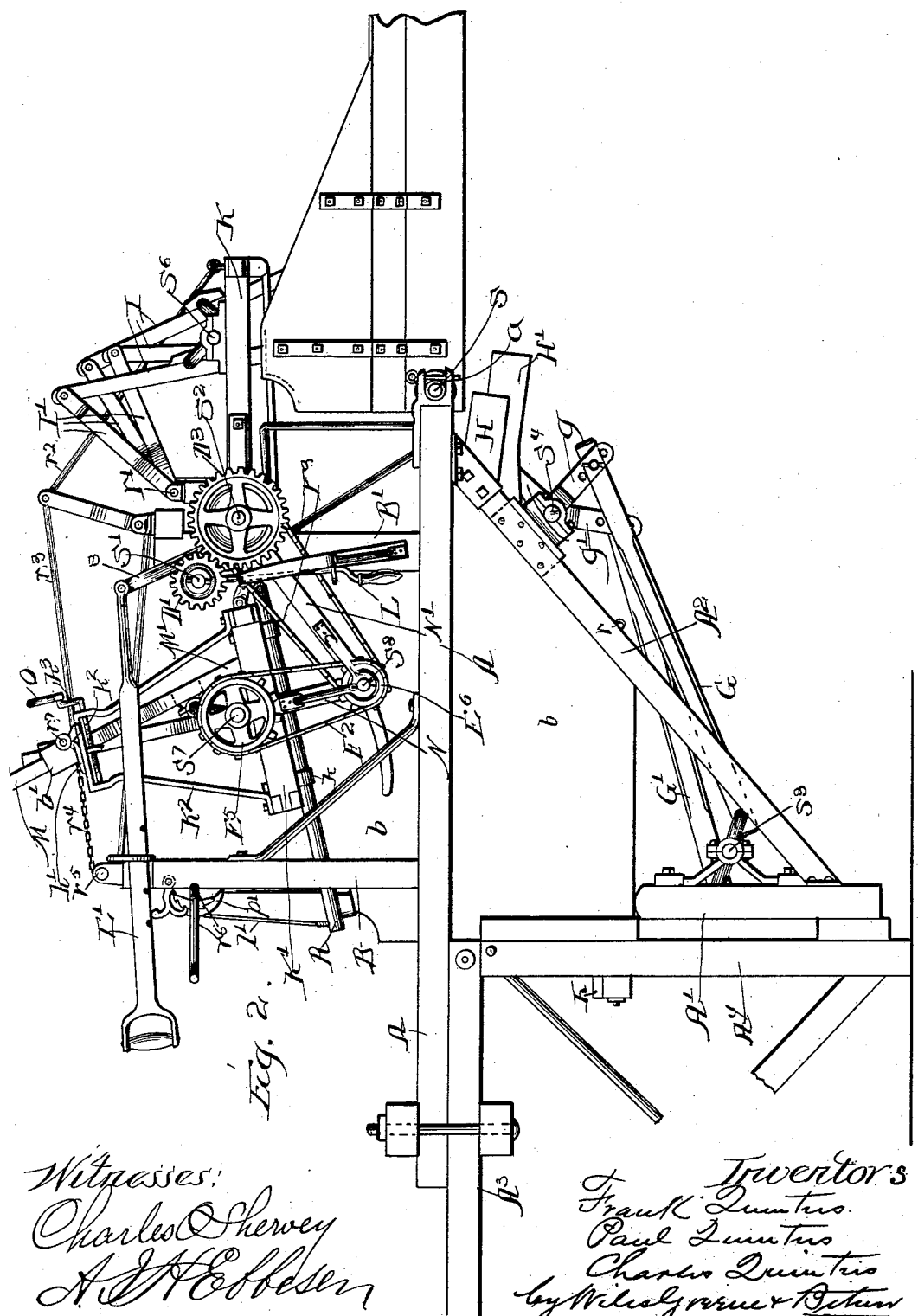
Figure 3:
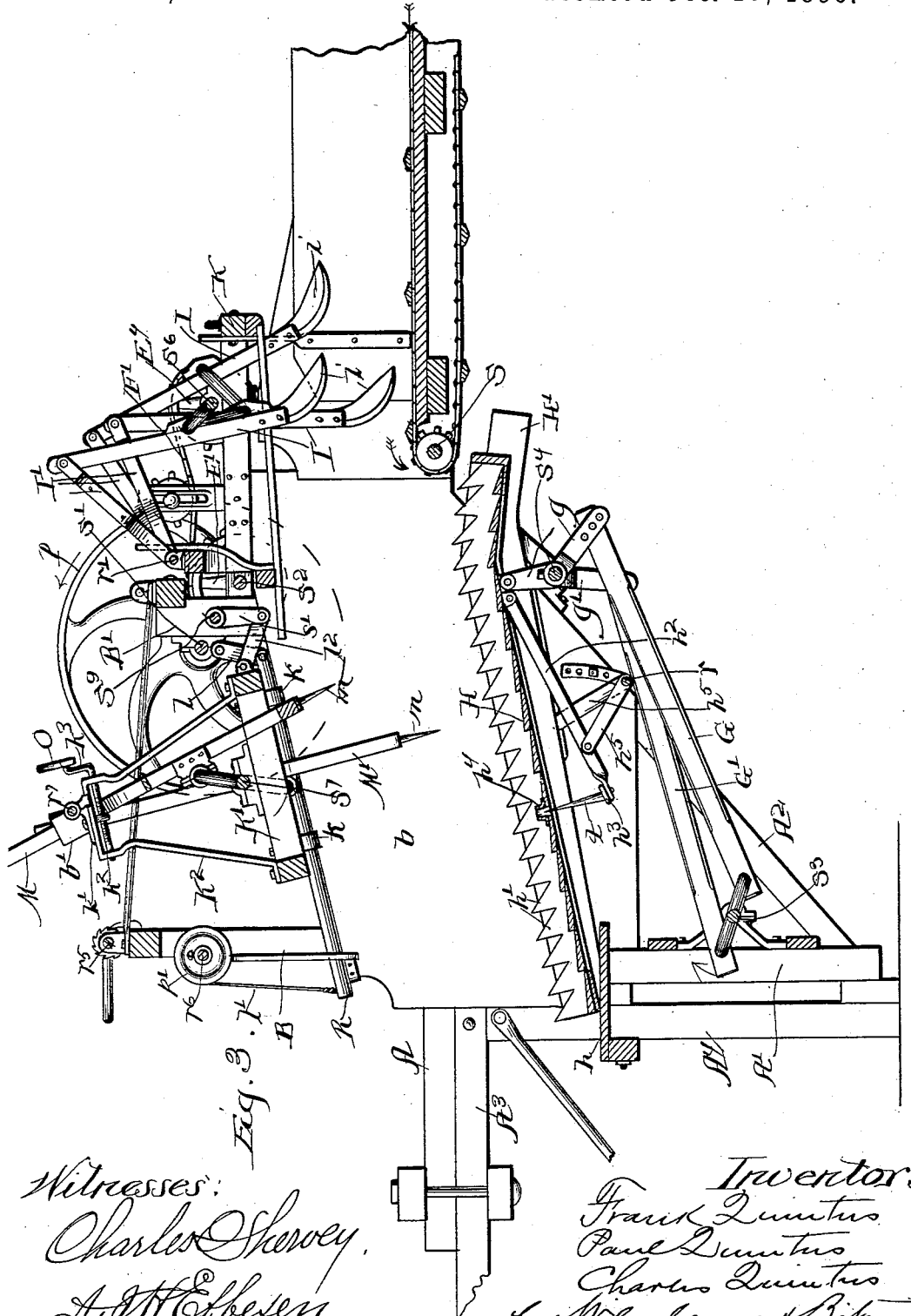
Figure 4:
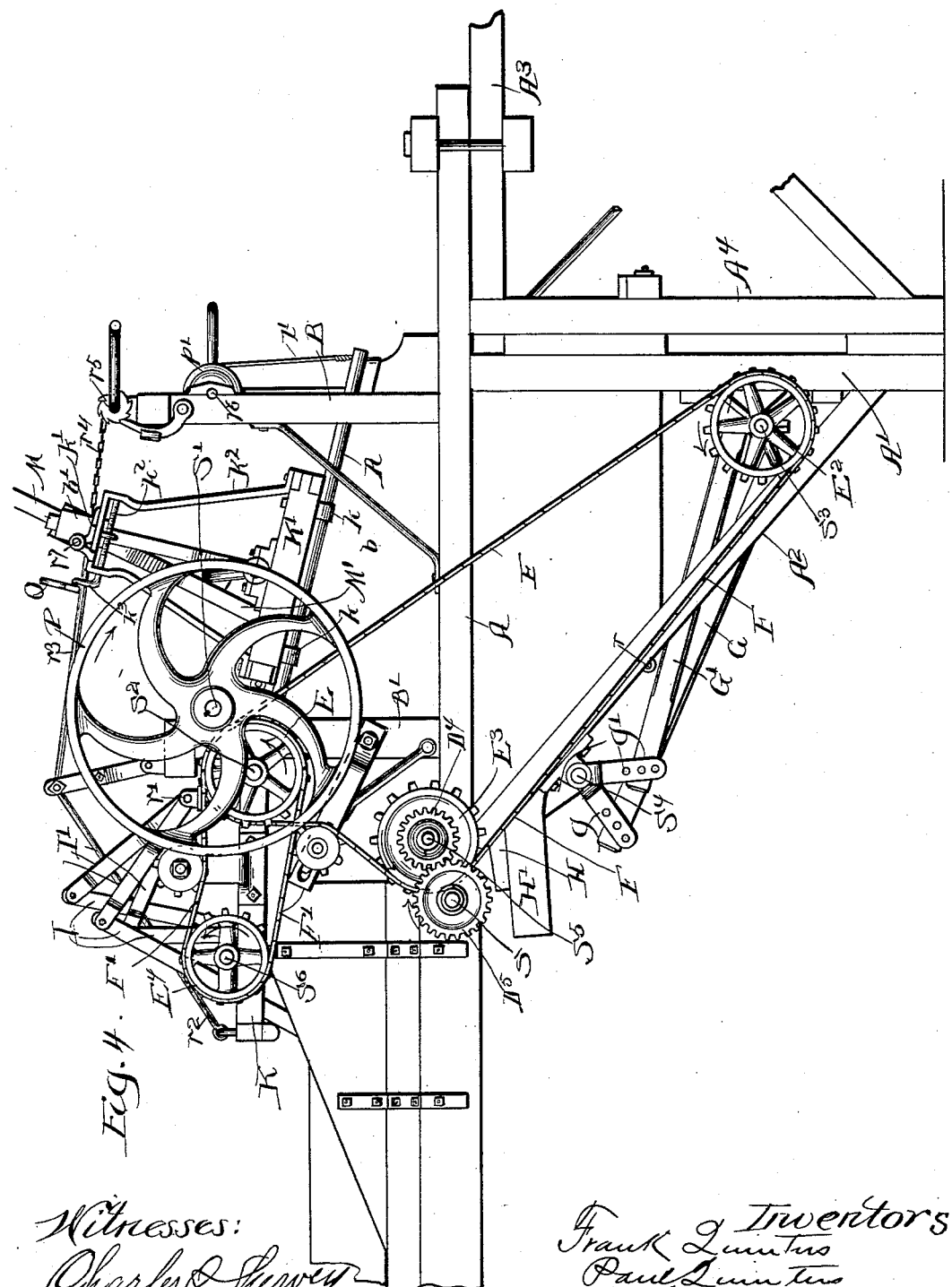
Figure 5:
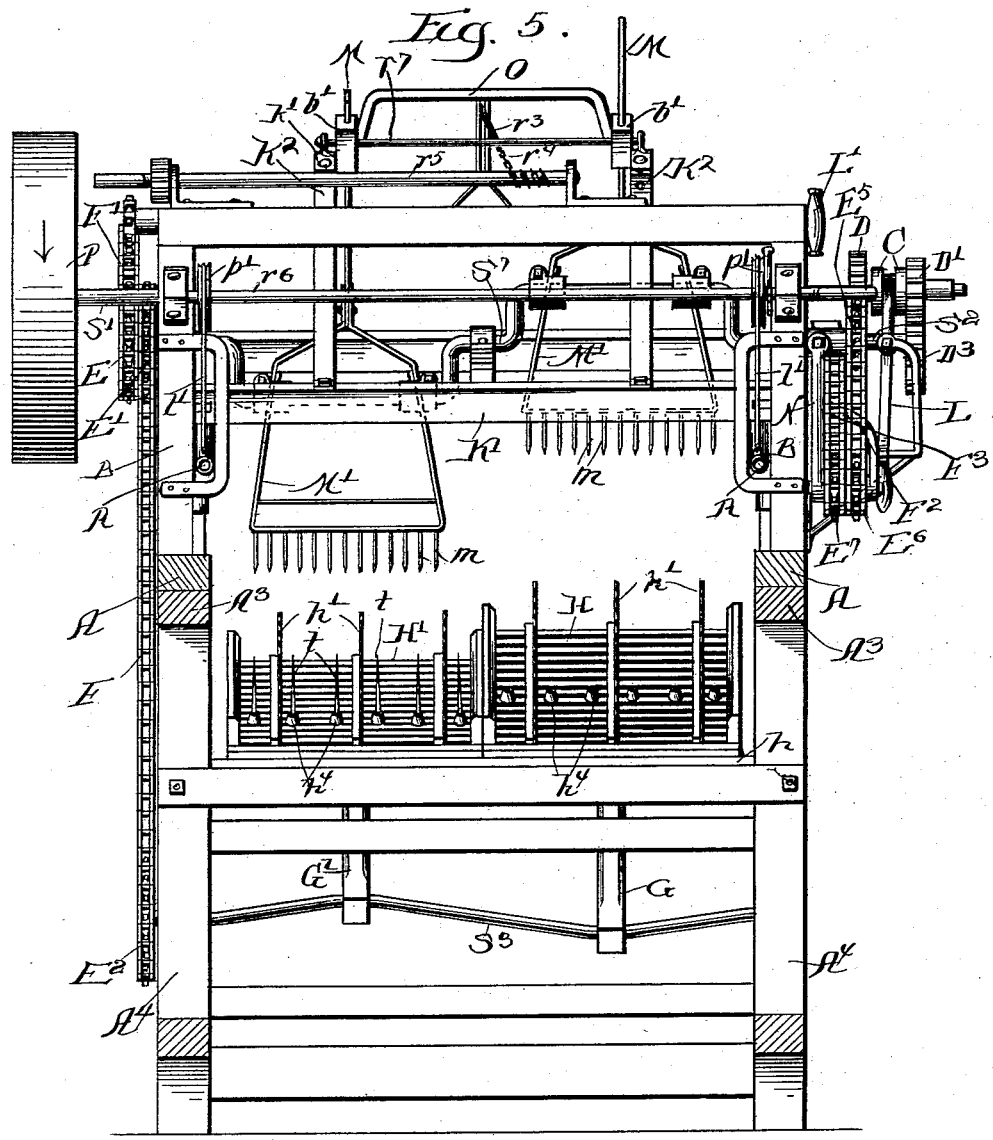
Figure 6:
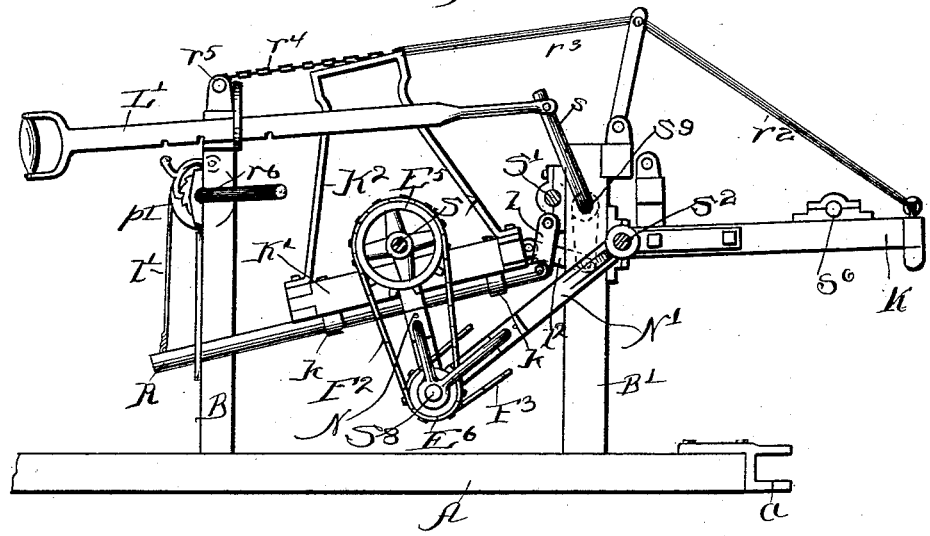
Figure 7:
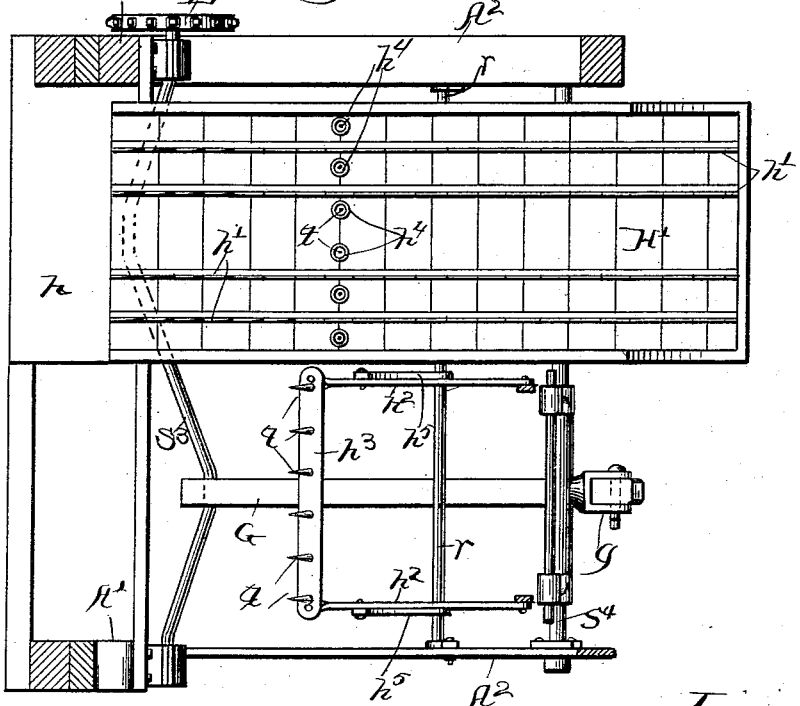

Figure 1 is a top plan of an attachment embodying our invention. Fig. 2 is a side elevation thereof, the view being in the direction indicated by the arrow $x$, Fig. 1. Fig. 3 is a longitudinal vertical section of the machine through the line 3 3, Fig. 1, the view being in the same direction as in Fig. 2. Fig. 4 is an opposite side elevation of the machine, the view being in the direction indicated by the arrow $x'$, Fig. 1. Fig. 5 is an end elevation of the machine, the view being in the direction indicated by the arrow $x^2$, Fig. 1. Fig. 6 is a detail view showing the connection of the rake-operating mechanism with the shaft from which it is driven. Fig. 7 is a top plan of one of the longitudinally-oscillating tables forming part of the delivering mechanism of the machine, the other table being removed to show working parts beneath. Fig. 8 is a plan view of a stop-motion adapted to be applied to the feed-operating shaft S'. Fig. 9 is a vertical section through the line 9 9, Fig. 8, the view being in the direction indicated by the arrow in Fig. 8.

In the views, A A' A² are horizontal, vertical, and oblique timbers, respectively, fastened together and arranged in opposite sets to form the main frame of our attachment. The timbers A A A' A' may be fastened in any desired way to the front end of the frame of a thresher, as, for instance, by extending the rear ends of the horizontal timbers A A over corresponding horizontal timbers A³ A³, forming part of the frame of the thresher, and connecting them by means of suitable bolts or clamps, the vertical timbers A' A' being held vertical by their contact with vertical timbers A⁴ A⁴ of the thresher-frame, as shown in Fig. 4. Upon each of the timbers A A rest suitably-braced vertical standards B B', and to the standards on either side are fastened side boards $b$ $b$, Fig. 3, extending suitable distances above and below the horizontal timbers A A. On the front ends of the horizontal timbers A A are fastened castings formed with notches $a$, adapted to receive a transverse shaft S, as shown in Fig. 2, this shaft being provided with means for supporting the rear end of an endless conveyer whose front end is supported by a similar shaft, the shaft S being provided with means for its rotation, as hereinafter described, and the rotation of the shaft being adapted to move the endless conveyer in the direction indicated by the arrow upon it in Fig. 3.

On the vertical standards B' B' and near their upper ends are fastened suitable boxes in which is journaled a transverse shaft S' parallel to the shaft S and provided at one end with a driving-pulley P, adapted to receive motion from any suitable source of power and thus to rotate the shaft. On the opposite end of the shaft are loosely mounted two pinions D D' of different diameters, and in the space between them is a clutch-disk C, adapted to be operated by a suitable lever L and thrown into engagement with either of the two pinions or held out of engagement with them both, the disk itself being so connected with the shaft as to slide upon it, but turn with it, and the arrangement of the two pinions, the disk, and its lever being substantially as shown in Figs. 1, 2, and 5. The pinions D D' engage, respectively, two pinions D² D³, rigidly mounted on a shaft S², parallel to the shaft S', and it is evident that when the clutch-disk is in engagement with either of the pinions D D' the rotation of the shaft S' must rotate the shaft S² in the opposite direction. On the end of the shaft S², opposite the pinions D² D³, are rigidly mounted two sprocket-wheels E E', the sprocket-wheel E' being connected by means of a chain F with a sprocket-wheel $E^2$, Figs. 1, 4, and 5, mounted on one end of a crank-shaft $S^3$, journaled in suitable boxes attached to the vertical timbers $A'$ $A'$, as shown in Fig. 4. The cranks on the shaft $S^3$ engage the rear ends, respectively, of two pitmen G G', whose front ends are pivoted to arms $g$ $g'$, respectively, these arms being loosely mounted on a shaft $S^4$, supported in boxes fastened to the oblique timbers $A^2$ $A^2$ near their upper ends. Each of the arms $g$ $g'$ is provided with an upward extension, as shown in Fig. 3, and these extensions are pivoted at their upper ends to longitudinally-oscillating tables H H', lying side by side and extending forward to a line below the rear end of the endless conveyer already mentioned. The chain F not only connects the sprocket-wheels E $E^2$, but also passes over a sprocket-wheel $E^3$, lying in the same vertical plane as the sprocket-wheels E $E^2$ and mounted on a short shaft or gudgeon $S^5$, supported by the frame of the machine. A pinion $D^4$ is rigidly fastened to the sprocket-wheel $E^3$ and engages a pinion $D^5$, mounted on the shaft S, which supports one end of the endless conveyer above mentioned, so that the rotation of the shaft $S^2$ rotates the shafts S $S^3$ and thereby operates the endless conveyer, the pitmen G G', and the tables H H'. The rear ends of the tables H H' rest on a board $h$, supported by the frame of the thresher or by the frame of the attachment, and as the tables are moved longitudinally their rear ends move back and forth across this board.

Each of the tables H H' has on its upper face a series of longitudinal parallel bars $h'$, having serrated edges, as shown in Fig. 3, and each of them is further provided with a rake-like device placed beneath it and consisting of two parallel longitudinal bars $h^2$ $h^2$, pivoted at their front ends to the lower face of the tables, and a transverse bar $h^3$, provided with teeth $t$ of such length that when swung upward they may pass through the table and extend above the bars $h'$, each table being provided with a series of thimbles $h^4$, permitting the passage of the teeth $t$ and serving as guides and guards therefor. The front end of each of the bars $h^2$ is connected by a downwardly-extending link $h^5$ with a stationary transverse rod $r$, Figs. 3 and 7, the proportions of all the parts being such that when either of the tables is at the forward limit of its stroke all the bars $h^2$ $h^3$ of the rake beneath it shall be approximately in contact with its lower surface and the teeth $t$ of the rake shall be pressed upward through the table to their highest limit. It is evident that grain deposited on the endless conveyer must be carried forward thereby and dropped upon the tables H H', and the office of the tables and the rakes beneath them is hereinafter fully explained.

The sprocket-wheel E of the shaft $S^2$ is connected by a chain F' with a sprocket-wheel $E^4$, lying in the same vertical plane therewith and mounted on a crank-shaft $S^6$, journaled in suitable boxes attached to a frame K, pivoted at its rear end on the shaft $S^2$, and on the cranks of the shaft $S^6$ are pivoted a series of knife-carrying bars I I, provided at their lower ends with knives $i$. Each of the bars I is pivoted at its upper end to an oscillating lever I', the rear ends of all the levers being pivoted on a transverse rod $r'$, Figs. 1, 3, and 4, and the rotation of the crank-shaft $S^6$ being adapted to swing each of the knives in a curved path lying in a vertical plane. The position of the front end of the frame K may be regulated by means of rods $r^2$ $r^3$, extending backward from it and connected with a chain $r^4$, attached to a transverse rod $r^5$, which may be rotated to wind the chain about it and is secured against accidental reverse rotation by means of a pawl and ratchet, as seen in Fig. 4. By means of the rods $r^2$ $r^3$, chain $r^4$, and transverse rod $r^5$ the front edge of the frame K may be raised or lowered and the distance of the knives from the upper surface of the endless conveyer may thus be regulated at will and the knives be thereby adapted to operate upon and cut the bands of bundles of different diameters resting on the conveyer and moved thereby toward the thresher.

Near the upper edges of the side-boards $b$ $b$ are suspended two parallel rods R R, whose front ends are almost directly below the shaft S' and are supported by short links $l$ $l$, Figs. 3 and 6, their front ends being supported by cords or chains $l'$, attached to pulleys $p'$ $p'$, mounted on a transverse rod $r^6$, which may be turned by means of a crank for the purpose of winding or unwinding the cords and thus raising or lowering the rear ends of the rods. A pawl and ratchet (shown in Fig. 6) prevents accidental rotation of the rod $r^6$ and thus holds the rear ends of the rods R R at any desired height. On the rods R R rests a rectangular frame K', held in place by clasps $k$ $k$, which encircle the rods R R and permit the frame to slide longitudinally upon the rods. On the frame are mounted two horses $K^2$ $K^2$, parallel to each other and to the sides of the machine, and a transverse rod $r^7$ extends from one of these horses to the other and is supported by them. On the rod $r^7$ are pivoted two blocks $b'$ $b'$, lying, preferably, close to the inner faces of the two horses, and in these blocks slide in approximately vertical directions the shanks M M of two rake-heads M' M', each provided with a series of teeth $m$ $m$, set in its lower edge. The two rake-heads M' M' are connected by suitable boxes with oppositely-placed cranks formed on a crank-shaft $S^7$, which is mounted in suitable boxes on the frame K'. On one end of the shaft $S^7$ is mounted a sprocket-wheel $E^5$, which is connected by means of a chain $F^2$ with a sprocket-wheel $E^6$, mounted on a short shaft $S^8$ at the lower end of an arm N, depending from the frame K'. (See Fig. 2.) A second sprocket-wheel $E^7$ is also mounted on the shaft $S^8$ and is connected by a chain $F^3$ with a sprocket-wheel $E^3$, mounted on the shaft $S^2$. (See Fig. 1.) The shaft $S^8$ is held at a fixed distance from the shaft $S^2$ by means of an arm $N'$, whose ends are pivoted on the two shafts, and the shaft $S^8$ thus forms the pivot of an elbow-joint interposed between the shafts $S^2 S^7$ and permitting transmission of motion from the shaft $S^2$ to the shaft $S^7$ whatever may be the position of the frame $K'$ upon the rods R R. It is evident that the rotation of the shaft $S^7$ must move the rake-heads $M' M'$ in curved paths, each of them being carried toward the thresher in the lower portion of its path and away from the thresher in the upper portion thereof. The raising and lowering of the rear ends of the rods R R changes the vertical position of the rake-heads and adapts them for use with grain varying in quantity, and the variation of the position of the frame $K'$ upon the rods R R makes it possible to move the rakes toward or away from the thresher and thus to bring them to bear upon any points at which the grain may become massed or clogged.

The frame $K'$ may be adjusted in any convenient manner upon the rods R R, one practical adjusting device being shown in Figs. 1, 2, 3, and 6, in which $S^9$ is a transverse shaft journaled in the standards $B' B'$ and provided at one end with an upwardly-extending crank $s$, connected at its upper end with a lever $L'$, by means of which the shaft may be rocked in either direction. The shaft $S^9$ is further provided with two downwardly-extending arms $s'$, and the lower ends of these arms are connected by links $l^2$ with the front edge of the frame $K'$. The longitudinal movement of the lever $L'$ in either direction moves the crank $s$ and rocks the shaft $S^9$ accordingly, and thus swings the arms $s'$ in one direction or the other, thereby moving the frame $K'$ upon the rods R R and changing the position of the rake-heads $M' M'$.

The crank-shafts $S^3 S^7$ are so placed with relation to each other that each of the tables H H' moves always in a direction opposite to the rake-head $M'$ immediately above it, each table being moved away from the thresher as the corresponding rake-head moves toward it. The effect of the movement of each rake-head toward the thresher is to move the grain upon the table beneath it in the same direction, and the opposite movement of the table tends to carry the grain away from the thresher. The result of the combined movement is that the upper portion of the layer of grain upon the tables is constantly moved toward the thresher, while the grain in immediate contact with the surface of the tables is retarded. This retardation of the movement of the lower portion of the grain in the bundles is assisted by the teeth upon the bars upon the tables and is still further aided by the teeth $t$ of the rakes beneath the tables, which project above each table during a part of its movement away from the thresher.

So far as the reverse movement of the tables and the rakes above them is concerned, the device shown and described herein is not broadly new, that feature of operation being shown and described in the Letters Patent granted to Louis Quintus and William Quintus, No. 507,163, and dated October 24, 1893, but the combination with the tables of the rakes beneath them, adapted to project upward through them as they move away from the thresher, is an improvement upon the mechanism shown in said prior application, as is also the adjustment of the overhead feeding-rakes by means of which they may be brought to operate upon different parts of the tables beneath them.

The transverse rod $r^7$, on which the blocks $b' b'$ are pivoted, is supported by the horses $K^2 K^2$, as above set forth, and may be stationary with relation to them, but it is preferably mounted in sliding bars $k'$, resting on the upper faces of the horses and provided with downward extensions passing through longitudinal slots in the horses. Each of the downward extensions engages a screw-threaded bolt $k^2$, provided with a crank $k^3$, as is clearly shown in Figs. 2 and 3, and the cranks $k^3$ of the two bolts are connected by a transverse yoke O, (shown in top plan in Fig. 1,) by means of which the cranks may be simultaneously rotated and the rod $r^7$ be moved backward or forward upon the horses. The rotation of these cranks, and the consequent movement of the rod $r^7$, varies the position of the upper ends of the rake-shanks M M, and thus adjusts the position of the rakes with reference to the tables beneath them and the grain resting thereon.

Figs. 8 and 9 illustrate a stop-motion which we have found it desirable to apply to the shaft $S'$, the object being to stop the rotation of the shaft $S^2$ whenever the speed of rotation of the cylinder of the thresher falls below a predetermined limit. As shown in these figures, the loose gear $D'$ of the shaft $S'$ is provided with a cone Z, formed on its outer face and lying within a conical recess formed in a block $Z'$, free to slide upon the cylinder, and a collar $Z^2$ is rigidly fastened upon the shaft $S'$ near its end and supports two bell-crank levers Y Y, having balls $y\ y$ at their free ends. The opposite ends of the bell-crank levers are connected by links $y'$ with the recessed block $Z'$, which engages the cone Z. It is evident that rapid rotation of the shaft $S'$ and collar $Z^2$ must tend to throw the balls $y\ y$ outward and force the recessed block into frictional contact with the cone Z, thereby rotating the pinion $D'$ and through it the gear-wheel $D^3$ and shaft $S^2$. The balls are preferably connected by a spring, which may be under such tension as to regulate the rate of rotation required to throw the balls apart and move the recessed block. The object of this stop-motion, as has already been stated, is to prevent the operation of the feeding mechanism except when the threshing-cylinder is running at the rate of speed required for its effective operation, the purpose being to feed grain to the cylinder only when it is running at such a speed as to thresh the grain properly.

Having now described and explained our invention, what we claim as new, and desire to secure by Letters Patent, is—

1. In a machine of the class described, the combination with a suitable frame adapted for attachment to a threshing-machine, of means for receiving bundles of grain and carrying them toward the thresher, knives adapted to sever the bands upon the bundles, oscillating rakes supported above the carrying mechanism, a crank-shaft connected with said rakes and adapted to move them alternately toward and away from the thresher, and means for adjusting the longitudinal position of the crank-shaft and rakes with reference to the thresher and thereby varying the points upon the carrying mechanism at which the rakes shall operate on the grain supported thereby.

2. In a machine of the class described, the combination with a suitable frame adapted to be attached to a threshing-machine, of means for supporting bundles of grain and carrying them toward the thresher, knives adapted to sever the bands of the bundles, a rake-supporting frame mounted on the main frame and adjustable longitudinally thereon, a crank-shaft mounted on said movable frame, oscillating rakes mounted on said movable frame and connected with said crank-shaft and means for operating said crank-shaft and moving said rakes alternately toward and away from the thresher, the movement of the rakes toward the thresher being adapted to feed the grain thereto, and the adjustment of the rake-supporting frame being adapted to vary the working points of the rakes with reference to the carrying mechanism beneath them.

3. In a machine of the class described, the combination with a suitable frame adapted to be attached to a threshing machine, of means for supporting bundles of grain and carrying them toward the thresher, knives adapted to sever the bands of the bundles, a suitably-rotated shaft mounted on the frame, a rake-supporting frame supported on the main frame above the carrying mechanism and longitudinally adjustable with reference to the machine, oscillating rakes mounted in said adjustable frame, a crank-shaft mounted on said frame and means substantially as shown and described connecting said crank-shaft with the rotating shaft on the main frame, whereby the rotation of the main shaft rotates the crank-shaft whatever may be the position of the rake-supporting frame upon the main frame.

4. In a machine of the class described, the combination with a suitable frame adapted to be attached to a thresher, of means for supporting bundles of grain and moving them toward the thresher, knives adapted to sever the bands of the bundles, vertically-adjustable supports mounted on the frame above the carrying mechanism, a rake-supporting frame mounted on said supports and adjustable lengthwise of the machine, oscillating rakes mounted on said frame, a crank-shaft also mounted on the frame and connected with said rakes and adapted by its rotation to oscillate the same, a suitably-rotated power-shaft mounted on the main frame and means substantially as shown and described connecting said power-shaft with said crank-shaft and adapted to transmit the rotation of the power-shaft to the crank-shaft whatever may be the position of the crank-shaft with relation to the power-shaft.

5. The combination with the frame of the machine, of bundle-carrying mechanism supported thereby, knives adapted to sever the bands of bundles supported by the carrying mechanism, the vertically-adjustable rods, R, R, supported above the carrying mechanism, the frame, K', supported by said rods and longitudinally adjustable thereon, the crank-shaft, $S^7$, mounted on the frame, K', the oscillating rakes, M, M', supported by said frame and connected with said crank-shaft, means for adjusting the frame upon the rods, R, R, the suitably-rotated shaft, $S^2$, mounted on the main frame, and the sprocket-wheels, $E^5$, $E^6$, $E^7$, $E^8$, and sprocket-chains, $F^2$, $F^3$, connected and combined substantially as shown and described and transmitting the motion of the shaft, $S^2$, to the crank-shaft.

6. In a machine of the class described, the combination with a suitable frame adapted to be attached to the thresher, of a conveyer adapted to receive bundles of grain and carry them toward the thresher, knives supported by the frame and adapted to sever the bands of the bundles, longitudinally-reciprocating tables adapted to receive the grain from the conveyer and support it in its passage to the thresher, rake-teeth lying beneath each table and adapted to be projected upward through it as it moves away from the thresher and to be dropped below it as it moves toward the thresher and oscillating rakes supported above said tables and adapted to move the grain thereon toward the thresher.

7. The combination with the frame of the machine, the endless conveyer adapted to receive bundles of grain and move them toward the thresher and the knives adapted to sever the bands of the bundles, of the longitudinally-reciprocating tables, H, H', adapted to receive grain from the conveyer, means substantially as shown and described for imparting reciprocal motion to the tables, the rake-frames, $h^2$, $h^3$, pivoted to the tables and lying below them and provided with teeth, $t$, adapted to be projected upward through the tables, means substantially as shown and described for operating said rake-frames and pressing the teeth upward through the tables as they move away from the thresher, the overhead feeding-rakes, M, M', and means substantially as shown and described for operating said overhead rakes and moving the grain on said tables toward the thresher, the tables and rakes being adapted to move always in opposite directions and the teeth, $t$, being adapted to retard the movement of portions of the grain toward the thresher; substantially as shown and described.

8. The combination with the frame of the machine, of the suitably-rotated crank-shaft, $S^3$, the shaft, $S^4$, parallel thereto, the arms, $g$, $g'$, pivoted on the shaft, $S^4$, and having upward extensions, the pitmen, G, G', connecting said arms with the crank-shaft, the longitudinally-reciprocating tables, H, H', supported on and oscillated by the upward extensions of the arms, $g$, $g'$, the rake-frames, $h^2$, $h^3$, provided at one end with teeth, $t$, and pivoted at the opposite end to the tables and the links, $h^5$, supporting the free ends of said rake-frames and adapted to force the teeth thereon upward through the tables as the latter move in one direction and to draw them downward as they move in the other direction; substantially as shown and described.

9. The combination with the main frame, and the bundle-supporting and band-cutting mechanisms supported thereby, of the vertically-adjustable rods, R, R, the frame, K', supported by the rods and moving longitudinally thereon, the transverse rod, $S^9$, provided with a crank, $s$, and the depending arms, $s'$, $s'$, the links, $l^2$, connecting said depending arms with the frame, K', and the lever, L', adapted to operate the crank, $s'$, and thereby to oscillate the rod, $S^9$, and move the frame, K', upon the rods, R, R.

10. The combination with the frame, K', the horses $K^2$, $K^2$, mounted thereon, the transverse rod, $r^7$, the bearings, $k'$, $k'$, supporting the rod, $r^7$, and sliding on the horses, the bolts, $k^2$, $k^2$, engaging said bearings and provided with cranks, $k^3$, of the yoke, O, connecting said cranks and adapted to rotate them in unison and thereby to vary the position of the rod, $r^7$, upon the horses; substantially as shown and described.

FRANK QUINTUS.
PAUL QUINTUS.
CHARLES QUINTUS.

Witnesses:
R. H. WILES,
W. M. SNYDER.